United States Patent [19]

Grazioli

[11] Patent Number: 4,572,515

[45] Date of Patent: Feb. 25, 1986

[54] BIDIRECTIONAL SEAL WITH WIDE TEMPERATURE RANGE

[75] Inventor: Angel J. Grazioli, Beziers, France

[73] Assignee: Cameron Iron Works, Inc., Houston, Tex.

[21] Appl. No.: 709,137

[22] Filed: Mar. 7, 1985

[30] Foreign Application Priority Data

Feb. 7, 1985 [FR] France ................................ 85 40020

[51] Int. Cl.⁴ .......................... F16J 15/24; F16J 15/32
[52] U.S. Cl. ......................................... 277/12; 277/26; 277/206 R; 277/209; 251/317
[58] Field of Search ..................... 277/12, 32, 152, 205, 277/206 R, 206 A, 207 R, 207 A, 208–211, 26; 251/317

[56] References Cited

U.S. PATENT DOCUMENTS

| | | | |
|---|---|---|---|
| 2,841,429 | 7/1958 | McCuistion | 277/206 A X |
| 2,983,533 | 5/1961 | Tisch | 277/206 A X |
| 3,052,478 | 9/1962 | Horvereid | 277/206 A X |
| 3,563,557 | 2/1971 | Doutt | 277/209 X |
| 4,135,545 | 1/1979 | Fowler | 251/317 X |
| 4,175,578 | 11/1979 | Priese | 277/26 X |

FOREIGN PATENT DOCUMENTS 895063   4/1962   United Kingdom ............ 277/207 R Primary Examiner—Robert S. Ward
Attorney, Agent, or Firm—Vinson & Elkins

[57] ABSTRACT

An improved bidirectional sealing element for sealing between two parallel cylindrical surfaces including an inwardly facing outer surface and an outwardly facing inner surface which includes a resilient sealing ring having a central mass, side masses on each side of the central mass, a pair of sealing lips extending radially outwardly and axially away from the central mass to engage and seal against said outer surface and a pair of sealing lips extending radially inwardly and axially away from the central mass to engage and seal against said inner surface, the side masses having a smaller internal diameter than the internal diameter of the central mass so that the side masses engage said inner cylindrical surface on contraction responsive to cooling prior to the engagement of the inner surface of the central mass so that the central mass continues to contract and causes said outer sealing lips to move radially outwardly to maintain their sealing engagement with said outer cylindrical surface.

5 Claims, 4 Drawing Figures

BIDIRECTIONAL SEAL WITH WIDE TEMPERATURE RANGE

BACKGROUND

With the use of thermoplastic materials for sealing corrosive environments considerable difficulties have been encountered in maintaining the seal when it is exposed to substantial variations in temperature. For example, a polytetrafluoroethylene (PTFE) seal which is exposed to temperature which varies from +300° F. down to −80° F., has a substantially larger coefficient of internal expansion than the metal bodies against which they seal so that prior seals have been unsatisfactory in such service.

The following U.S. patents disclose seals which may be pertinent with respect to the present invention:

U.S. Pat. No. 3,269,736 discloses a seal for cryogenic use having a first PTFE ring seal and a second ring spring of "Mylar" which like PTFE remains flexible at extremely low temperatures but also is more resilient at low temperatures to provide a spring action. U.S. Pat. No. 4,199,158 discloses a tunnel seal for use with concrete blocks. U.S. Pat. No. 4,201,310 discloses a bidirectional seal for the cover of a petrol drum. U.S. Pat. Nos. 4,371,177, 4,365,818, 4,034,959, 3,970,321, 3,829,106, 3,827,671 and 3,356,333 disclose a wide variety of shapes of seals suggested by the prior art.

SUMMARY

The present invention relates to an improved bidirectional seal which may be used over wide temperature ranges. This improved seal is particularly advantageous for use in a ball valve to seal between the valve seat ring and the body. The seal is preferably made of PTFE and provides a seal in the annular space between two spaced apart, parallel, cylindrical surfaces. The seal is shaped to have two end masses sized to be normally in close relationship to the inner (exterior) sealing surface with a central mass between and joining the two end masses and spaced substantially a greater distance from the inner (exterior) sealing surface. The seal includes a pair of lips extending outwardly from the central mass and axially away from each other for engagement with the outer (interior) sealing surface and a pair of lips extending from the inner portion of the central mass flared axially from each other for engagement with the inner (exterior) sealing surface. When the installed seal is subjected to cold temperatures (cooling) the end masses are supported from contracting and the central mass is free to contract. This relative movement causes the outer lips to move in a manner which maintains their sealing engagement with the outer (interior) sealing surface.

An object of the present invention is to provide an improved seal of a material having a high coefficient of thermal expansion with respect to the metal structures against which it is to seal which seal is shaped to maintain its sealing engagement even when cooled substantially.

Another object is to provide an improved bidirectional sealing element which maintains its sealing position through cycles of heating and cooling.

Still another object is to provide an improved ball valve structure with an improved seal between the cylindrical parallel surfaces of the body and the valve seat ring which remains sealed over a wide range of temperatures.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
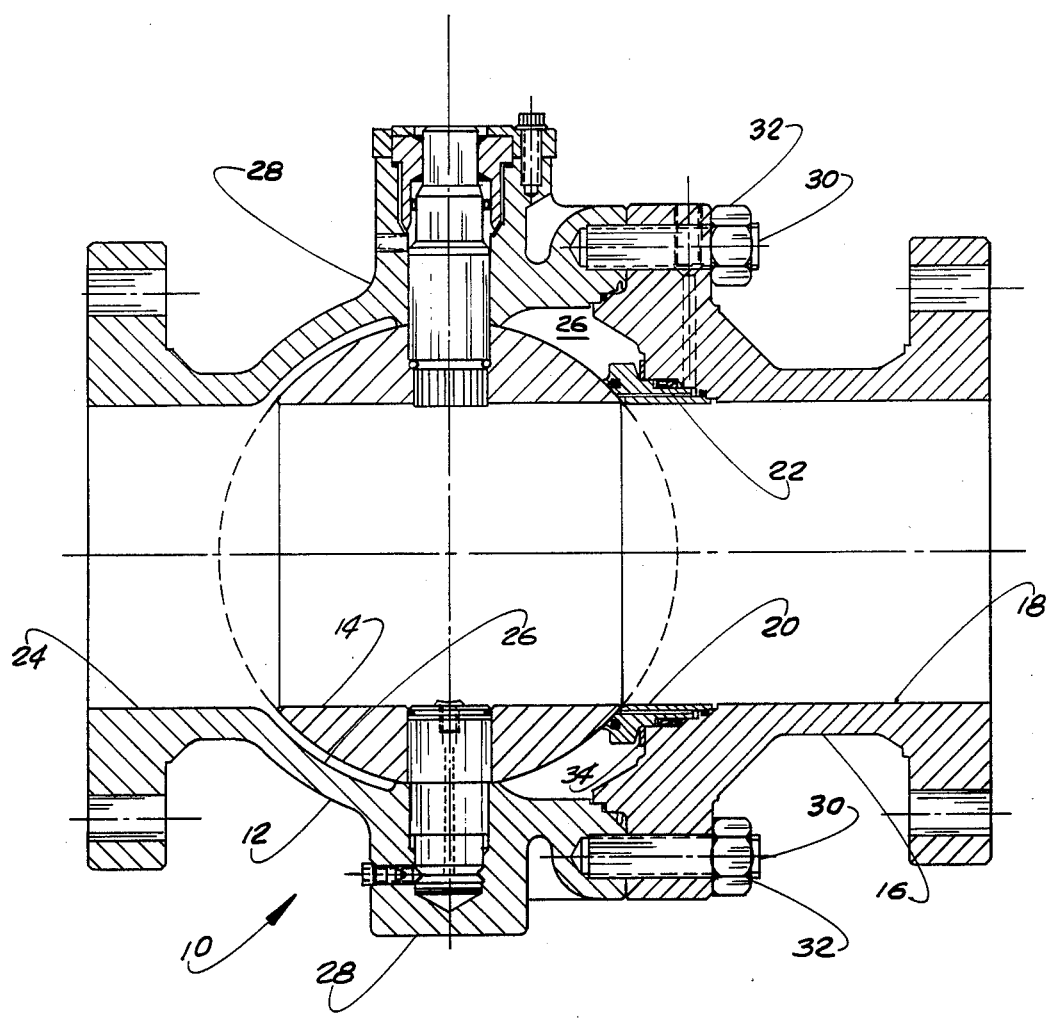
FIG. 1 is a sectional view of a ball valve having the improved bidirectional sealing element between the seat ring and the tubular body member defining the outlet.

Valve 10, shown in FIG. 1, includes body 12, valve member or ball 14, tubular member 16 which defines outlet 18, seat ring 20 and bidirectional seal 22. Body 12 defines inlet 24, a portion of valve chamber 26 and the trunnions 28 for mounting ball 14 in chamber 26. Tubular member 16 completes chamber 26 and is suitably secured to body 12 by studs 30 and nuts 32.

Figure 2:
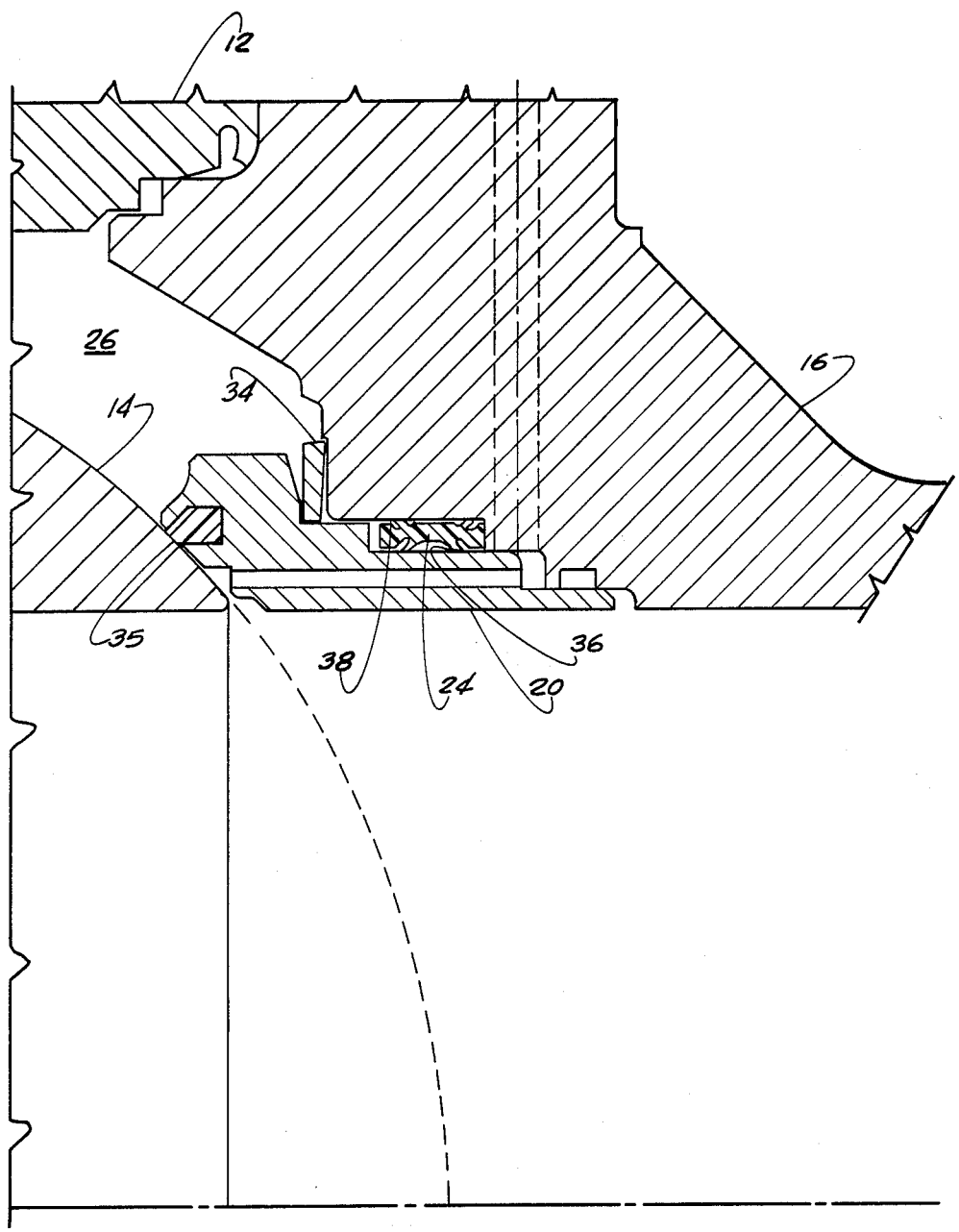
FIG. 2 is a detail, sectional view of the location of the improved bidirectional sealing element shown in FIG. 1.

Seat ring 20 is interposed between ball 14 and tubular body 16 and is urged into sealing engagement with the exterior of ball 14 by spring 34. Seal 35 is carried by seat ring 20 and engages the exterior of ball 14 to seal therebetween. Bidirectional seal 22 is positioned between the exterior (inner) cylindrical surface 36 of seat ring and the interior (outer) cylindrical surface 38 of tubular member 16. The position of seat ring 20 is illustrated more clearly in FIG. 2.

Bidirectional seal 24 includes central mass 40 and side masses 42 and 44 which are integral with central mass 40. As shown in both FIGS. 3 and 4, seal 24 is sized to have inner sealing lips 46, which extend inwardly and axially away from central mass 40, and outer sealing lips 48, which extend outwardly and axially away from central mass 40 with their point of origin being between central mass 40 and side masses 42 and 44, in sealing engagement with surfaces 36 and 38, respectively. In its normal sealed position, seal has side masses 42 and 44 slightly spaced from surface 36 and central mass 40 is spaced a greater distance from surface 36. The purpose of this spacing relationship from surface 36 is to ensure that responsive to cooling contraction of the three masses, central mass 40 has a much greater distance to contract before it is supported by surface 36. In this way its contraction introduces a tension on the upper central surface of central mass 40 to pull upper lips 48 upwardly and inwardly to maintain their sealing engagement with surface 38. The contraction of central mass 40 causes inner lips 46 to be pushed tighter into sealing engagement with surface 36.

Since seal 24 is preferably made of PTFE, it contracts much more rapidly than the metal of the cylindrical surfaces against which it seals. Normally such high rate of contraction causes problems of releasing the sealing engagement of the seal but with the improved seal design of the present invention a structure is provided which utilizes this high rate of contraction to offset the sealing problem caused thereby. Thus with the seal of the present invention such relatively high rate of contraction does not cause a problem but rather solves the problem normally occurring as a result of substantial cooling of the sealing element.

The improved bidirectional seal of the present invention is a suitable seal for use in ball valves as shown in the drawings and in many other applications. This seal is particularly applicable to environments which are corrosive and subject to temperature fluctuations, such as from 300 to −80 degrees Fahrenheit. The seal does not require the use of springs to maintain its seal under widely fluctuating temperatures.

What is claimed is:

1. A birectional sealing element for sealing between two parallel spaced apart cylindrical surfaces including an inwardly facing outer surface and an outwardly facing inner surface comprising a resilient sealing ring having a central mass and side masses integral with and on either side of said central mass, inner sealing means extending from the inner side of said sealing ring, and outer sealing means extending from the outer side of said sealing ring, said sealing ring and said inner and outer sealing means being sized to have both of said sealing means in sealing engagement with said inner and outer cylindrical sealing surfaces respectively, said side masses having a smaller internal diameter than said central mass so that on contraction by cooling said inner cylindrical surface limits the radial contraction of said side masses and said central mass is free to contract, said outer sealing means being arranged to be urged into tight sealing engagement with the outer cylindrical surface responsive to contraction of said central mass while said side masses are supported against contraction.

2. A sealing element according to claim 1 wherein said sealing ring is made of polytetrafluoroethylene.

3. A bidirectional sealing element comprising: a resilient sealing ring having a central mass, and a pair of side masses positioned one on each side of said central mass, a pair of sealing lips extending inwardly and axially away from said central mass, a pair of sealing lips extending outwardly from a position between said central mass and said side masses and also extending in a direction axially away from said central mass, said sealing ring being sized to have said inner and outer sealing lips in sealing engagement with the inner and outer cylindrical surfaces against which they are to seal, said side masses, on cooling, having smaller internal diameters than central mass so that said side masses are supported prior to the disengagement of the outer sealing lips from the outer sealing surface and with said central mass being spaced from the inner surface a sufficient distance whereby its further contraction on cooling causes said outer sealing lips to be urged into tighter sealing engagement with said outer sealing surface.

4. A ball valve comprising a body having a valve chamber therein with an inlet and an outlet extending through said body into and from said chamber, a ball positioned in said chamber, a seat ring positioned between said ball and said body surrounding the opening of said outlet from said chamber and having an exterior cylindrical sealing surface, said body having an interior cylindrical surface surrounding and spaced from said cylindrical sealing surface of said seat ring, and a sealing ring positioned between said sealing surfaces for sealing therebetween, said sealing ring having a central mass and side masses integral with the central mass, a pair of sealing lips extending outward and axially away from said central mass, and a pair of sealing lips extending inward whereby said outer lips engage said body interior cylindrical surface and said inner lips engage said seat ring exterior cylindrical surface, said central mass having a greater inner diameter than said side masses whereby cooling contraction of said sealing ring brings said end masses into supporting engagement with said valve seat exterior cylindrical surface while said outer lips are in sealing engagement with said body interior cylindrical surface and further cooling contracts said central mass with respect to the supported side masses to pivot said outer sealing lips outward to maintain their sealing engagement with said body interior cylindrical surface.

5. A ball valve comprising a body having a valve chamber with an opening into the valve chamber, a ball valve member mounted in the valve chamber and having a port therethrough to align with said opening or to close said opening, a tubular member secured to said body and having an opening communicating therethrough to the valve chamber and an internal cylindrical surface, a seat ring positioned surrounding the opening and against said ball valve member and having a seal engaging the exterior of said ball valve member and an external cylindrical surface facing and within said internal cylindrical surface of said tubular member, and a resilient sealing element positioned between said internal and said external cylindrical surfaces and having a central mass and side masses integral therewith, said side masses having smaller internal diameters than the internal diameter of said central mass, a pair of external sealing lips extending radially outwardly and away from said central mass and sealingly engaging said internal cylindrical surface, and a pair of internal sealing lips extending radially inwardly and away from said central mass and sealingly engaging said external cylindrical surface, said side masses on contracting responsive to cooling being supported on said external cylindrical surface so that said central mass which is free to continue its contraction causes said external sealing lips to be urged toward said internal cylindrical surface to ensure continued sealing during cycling of temperature.

* * * * *

UNITED STATES PATENT AND TRADEMARK OFFICE
CERTIFICATE OF CORRECTION

PATENT NO. : 4,572,515

DATED : February 25, 1986

INVENTOR(S) : Angel J. Grazioli

It is certified that error appears in the above—identified patent and that said Letters Patent is hereby corrected as shown below:

The title page should be deleted to appear as per attached title page.

Figure 3:
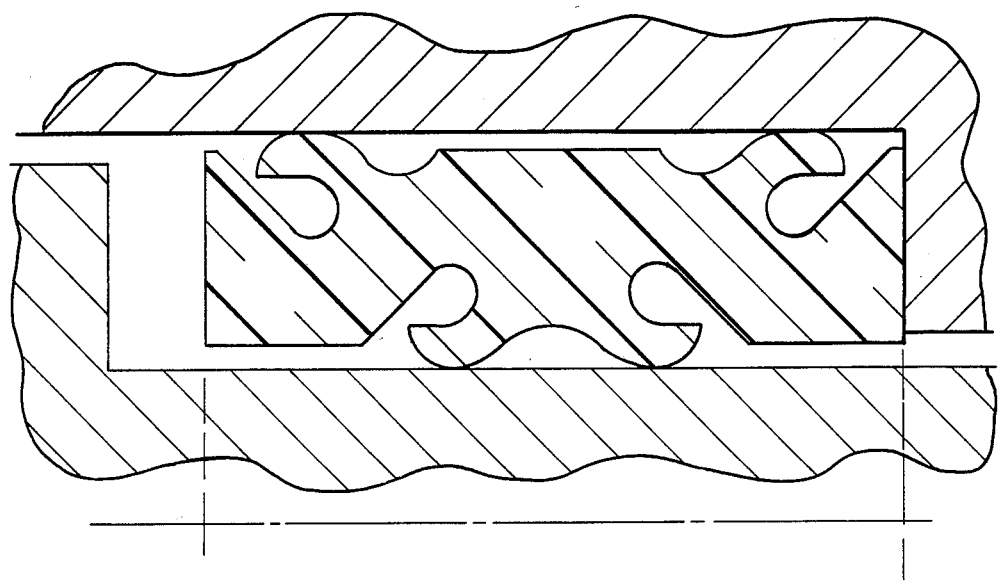
FIG. 3 is a detail, schematic, sectional view of the improved bidirectional sealing element of the present invention under normal temperature conditions.
Figure 4:
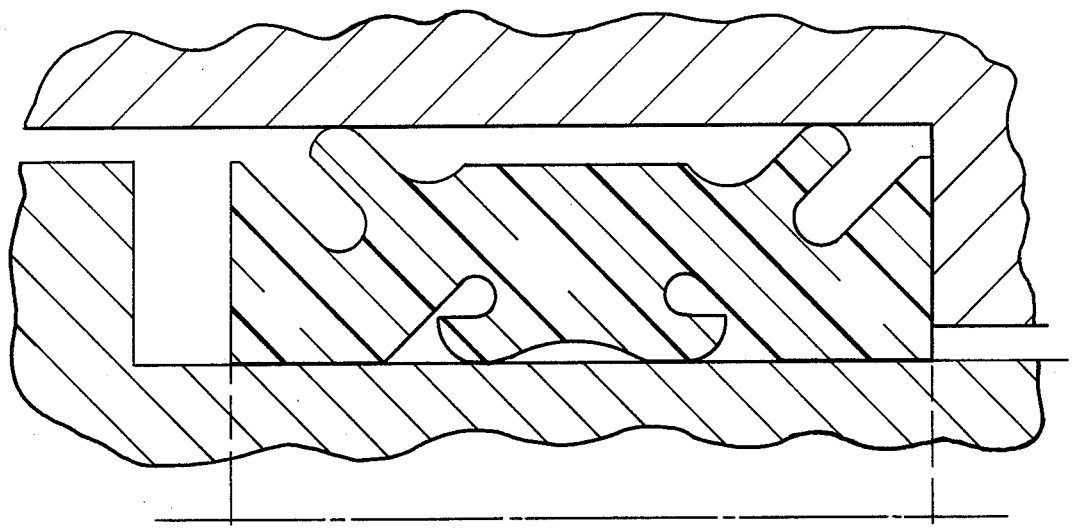
FIG. 4 is a detail, schematic, sectional view of the improved bidirectional sealing element of the present invention under low temperature conditions.
Figure 3:
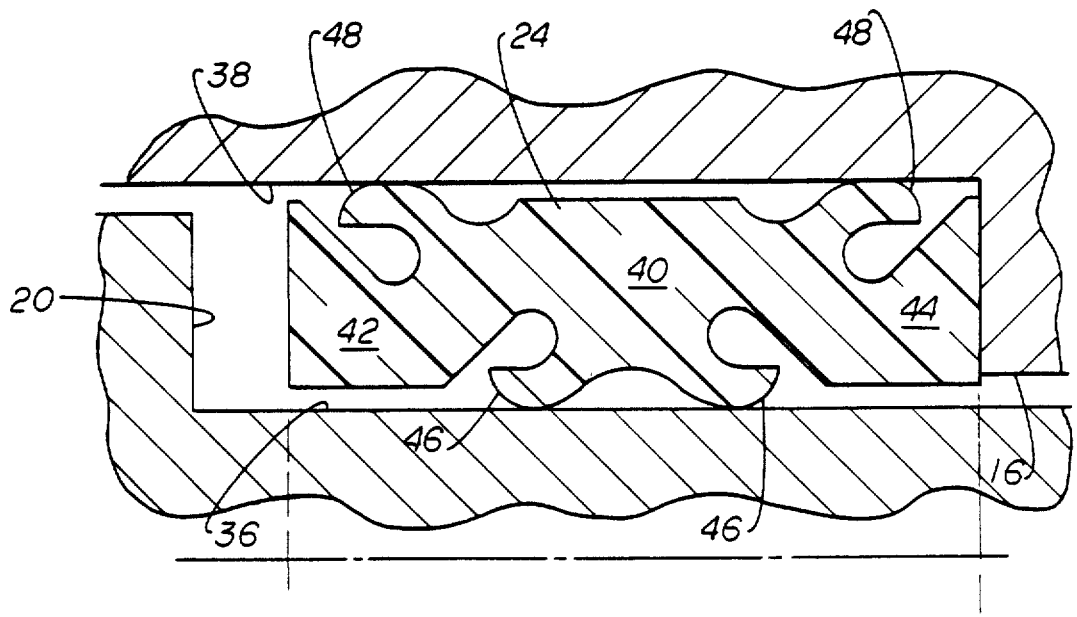
Figure 4:
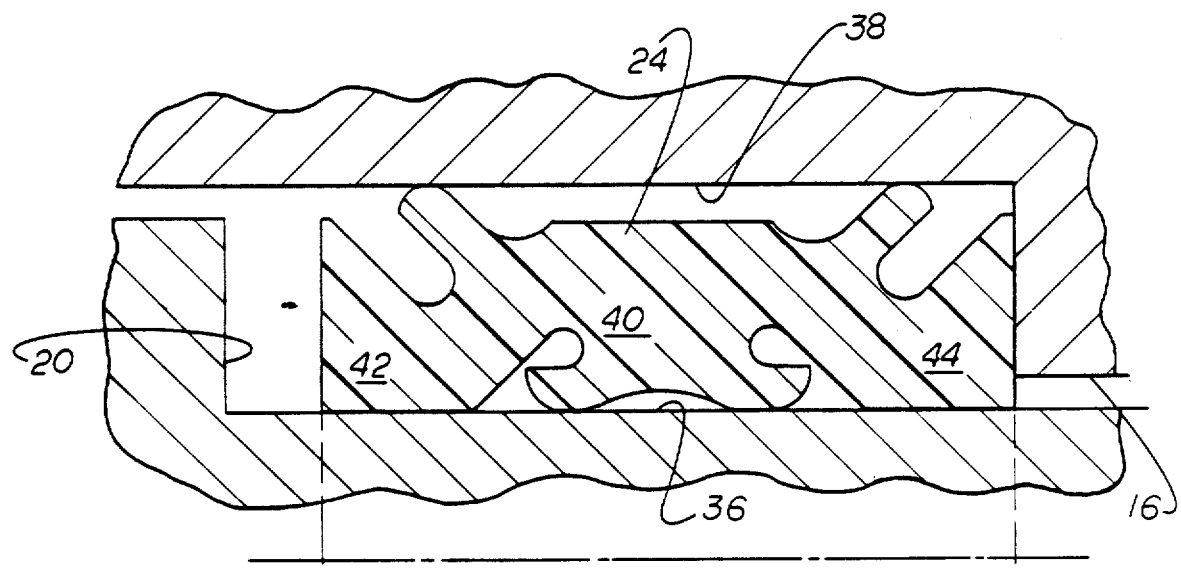

Please delete FIGS. 3 and 4 and substitute therefor new FIGS. 3 and 4.

Signed and Sealed this

Tenth Day of January, 1989

*Attest:*

DONALD J. QUIGG

*Attesting Officer*     *Commissioner of Patents and Trademarks*

United States Patent [19]
Grazioli

[11] Patent Number: 4,572,515
[45] Date of Patent: Feb. 25, 1986

[54] BIDIRECTIONAL SEAL WITH WIDE TEMPERATURE RANGE

[75] Inventor: Angel J. Grazioli, Beziers, France

[73] Assignee: Cameron Iron Works, Inc., Houston, Tex.

[21] Appl. No.: 709,137

[22] Filed: Mar. 7, 1985

[30] Foreign Application Priority Data

Feb. 7, 1985 [FR] France ........................ 85 40020

[51] Int. Cl.$^4$ .......................... F16J 15/24; F16J 15/32
[52] U.S. Cl. .......................................... 277/12; 277/26; 277/206 R; 277/209; 251/317
[58] Field of Search ................. 277/12, 32, 152, 205, 277/206 R, 206 A, 207 R, 207 A, 208–211, 26; 251/317

[56] References Cited

U.S. PATENT DOCUMENTS

| | | | |
|---|---|---|---|
| 2,841,429 | 7/1958 | McCuistion | 277/206 A X |
| 2,983,533 | 5/1961 | Tisch | 277/206 A X |
| 3,052,478 | 9/1962 | Horvereid | 277/206 A X |
| 3,563,557 | 2/1971 | Doutt | 277/209 X |
| 4,135,545 | 1/1979 | Fowler | 251/317 X |
| 4,175,578 | 11/1979 | Priese | 277/26 X |

FOREIGN PATENT DOCUMENTS

895063  4/1962  United Kingdom ........... 277/207 R

Primary Examiner—Robert S. Ward
Attorney, Agent, or Firm—Vinson & Elkins

[57] ABSTRACT

An improved bidirectional sealing element for sealing between two parallel cylindrical surfaces including an inwardly facing outer surface and an outwardly facing inner surface which includes a resilient sealing ring having a central mass, side masses on each side of the central mass, a pair of sealing lips extending radially outwardly and axially away from the central mass to engage and seal against said outer surface and a pair of sealing lips extending radially inwardly and axially away from the central mass to engage and seal against said inner surface, the side masses having a smaller internal diameter than the internal diameter of the central mass so that the side masses engage said inner cylindrical surface on contraction responsive to cooling prior to the engagement of the inner surface of the central mass so that the central mass continues to contract and causes said outer sealing lips to move radially outwardly to maintain their sealing engagement with said outer cylindrical surface.

5 Claims, 4 Drawing Figures

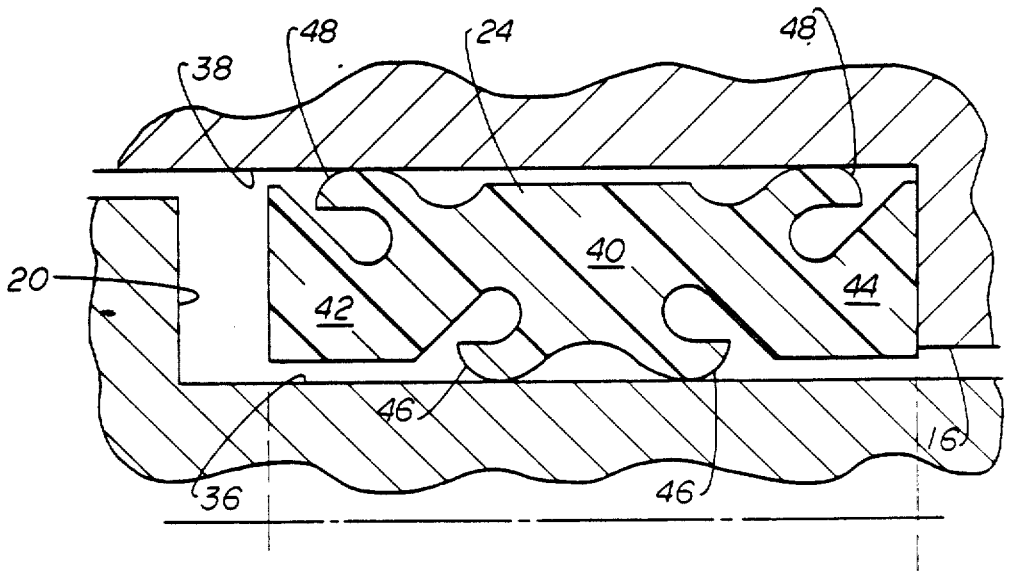

Fig. 3.